United States Patent [19]
Rahn

[11] Patent Number: 6,010,234
[45] Date of Patent: Jan. 4, 2000

[54] FLEXIBLE LIGHT SCRIM ATTACHABLE OVER PROTRUDING LIGHT MEMBERS

[76] Inventor: Reed Rahn, 610 W. 11th St., Tempe, Ariz. 85281

[21] Appl. No.: 09/024,412

[22] Filed: Feb. 17, 1998

Related U.S. Application Data

[60] Provisional application No. 60/060,497, Sep. 30, 1997.

[51] Int. Cl.[7] .................................................. G03B 15/02
[52] U.S. Cl. ............................................ 362/320; 362/278
[58] Field of Search .................................... 362/293, 278, 362/320, 355, 361

[56] References Cited

U.S. PATENT DOCUMENTS

| | | | |
|---|---|---|---|
| 1,767,340 | 6/1930 | Beman | 362/361 |
| 4,187,531 | 2/1980 | Lowell et al. | 362/322 X |
| 4,446,506 | 5/1984 | Larson | 362/278 X |
| 5,023,756 | 6/1991 | Regester | 362/320 X |
| 5,311,409 | 5/1994 | King | 362/17 |
| 5,567,038 | 10/1996 | Lary | 362/293 X |

*Primary Examiner*—Laura K. Tso
*Attorney, Agent, or Firm*—Parsons & Goltry; Robert A. Parsons; Micheal W. Goltry

[57] ABSTRACT

In an illuminating assembly of a type including a light-projecting element having a protruding light projecting member and a speed ring for coupling a hood with the light-projecting element, an apparatus for reducing the light intensity projected from the light projecting element and the protruding light projecting member into and through the hood, the apparatus comprising a scrim engagable when flexed with the speed ring to extend outwardly therefrom and over the protruding light projecting member.

7 Claims, 2 Drawing Sheets

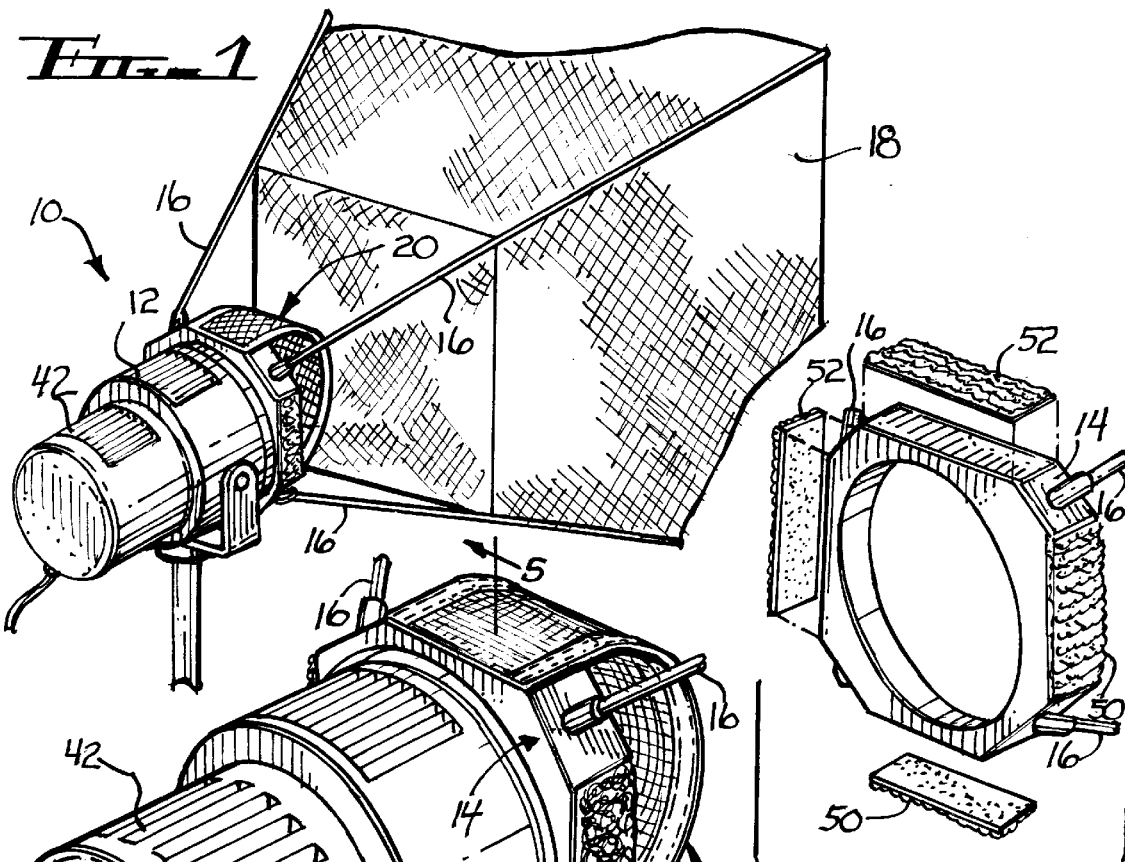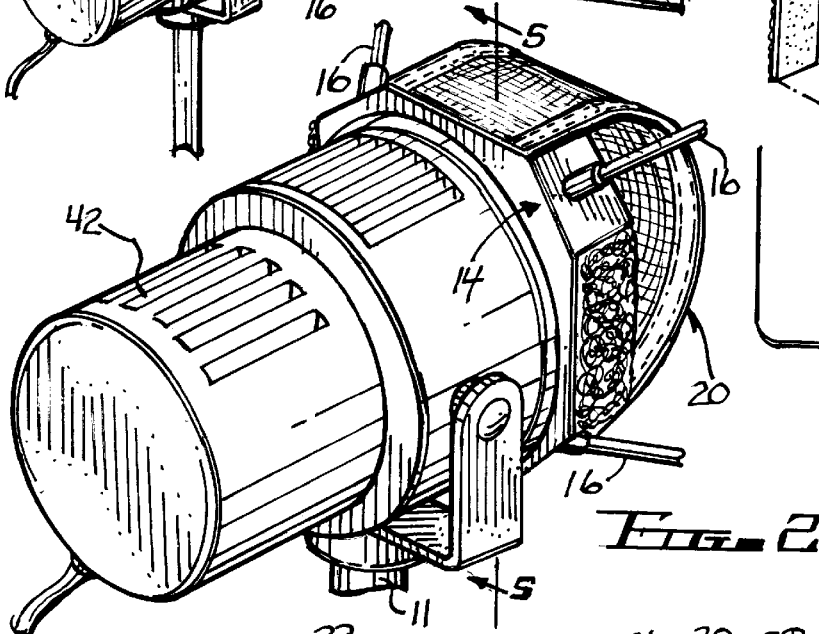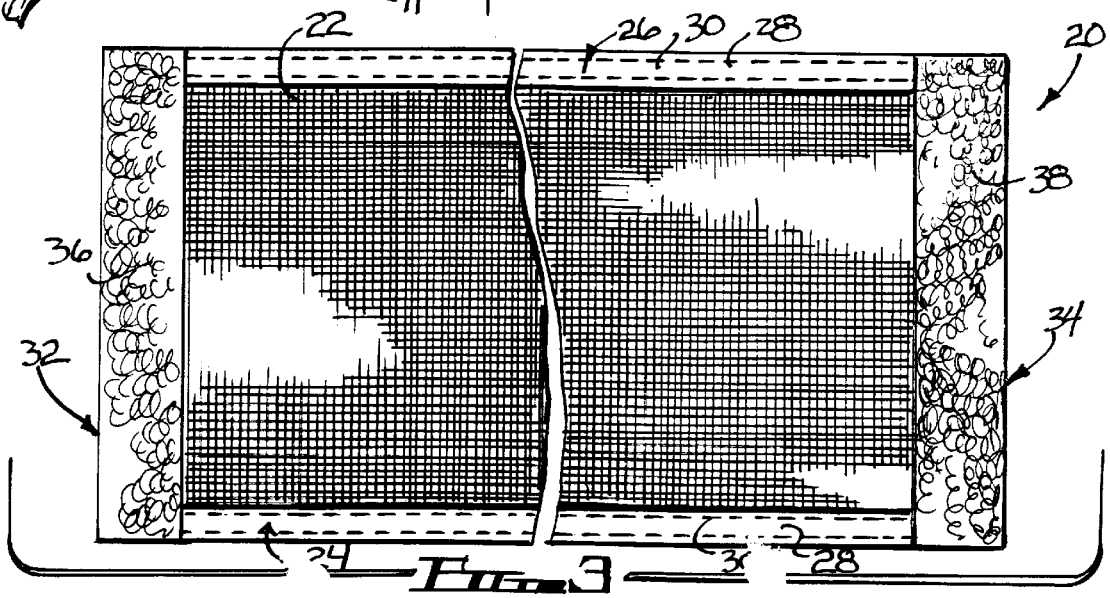

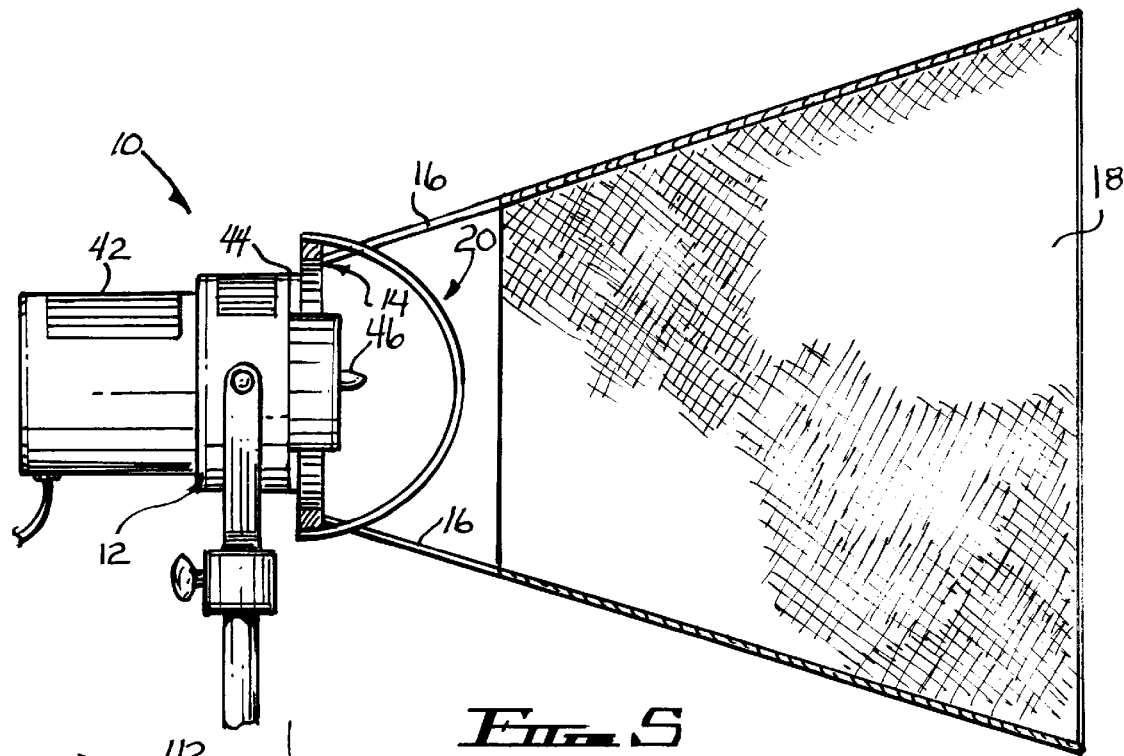
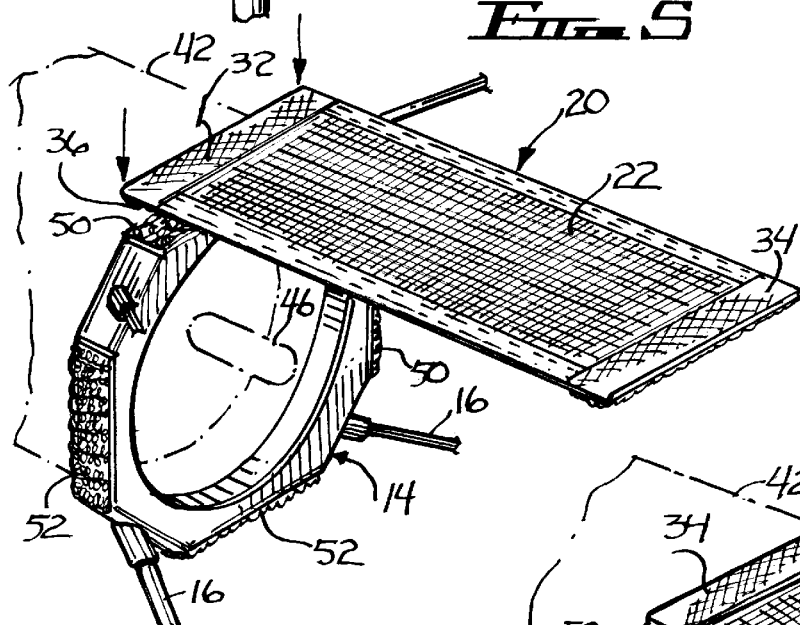
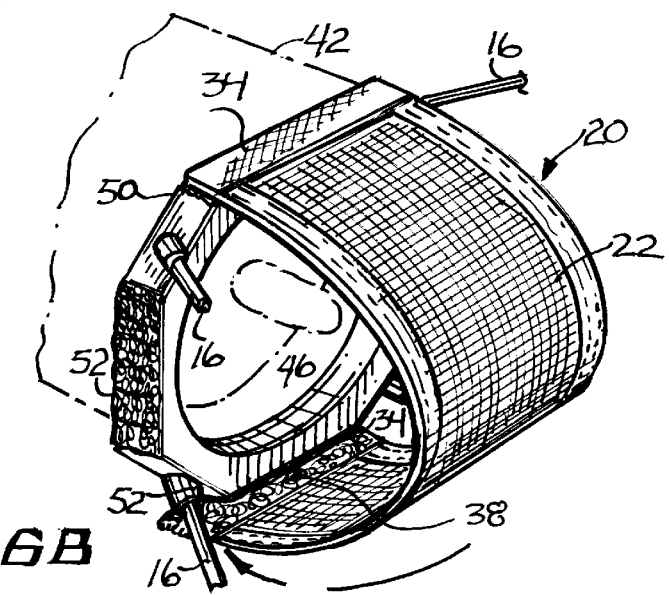

FLEXIBLE LIGHT SCRIM ATTACHABLE OVER PROTRUDING LIGHT MEMBERS

This application claims the benefit of Provisional Appln No. 60/060,497 filed Sep. 30, 1997.

BACKGROUND OF THE INVENTION

1. Field of the Invention

This invention relates generally to the field of filters. More particularly, this invention relates to light filters.

In a further and more specific aspect, the present invention relates to a light scrim for controlling the intensity of light provided from a light source.

2. Prior Art

The art is replete with various types of filters for use in controlling the intensity of light provided from a light source. Such filters are commonly found in photographic equipment of the type having a light-projecting element for directing light into and through a hood. Although exemplary, most known filters are difficult and expensive to construct, difficult to install and often either discolor or melt to adversely affect photographic activity. The foregoing and other deficiencies therefore necessitate certain new and useful improvements.

It would be highly advantageous, therefore, to remedy the foregoing and other deficiencies inherent in the prior art.

Accordingly, it is an object of the present invention to provide a scrim for controlling the intensity of light provided from a light projecting element.

Another object of the present invention is to provide a scrim that is easy to construct.

And another object of the present invention is to provide a scrim that is inexpensive.

Still another object of the present invention is to provide a scrim that is easy to install with an apparatus of as type including a light-projecting element having a protruding light projecting member and a speed ring for coupling a hood with the light-projecting element.

Yet another object of the instant invention is to provide a scrim that is resistant to damage or discoloration from prolonged exposure to heat.

Yet still another object of the instant invention is to provide a scrim that is easy to use.

SUMMARY OF THE INVENTION

Briefly, to achieve the desired objects of the instant invention in accordance with a preferred embodiment thereof, provided is an illuminating assembly of a type including a light-projecting element having a protruding light projecting member and a speed ring for coupling a hood with the light-projecting element. Further included is a scrim engagable when flexed with the speed ring to extend outwardly therefrom and over the protruding light projecting member, the scrim being operative for reducing the light intensity projected from the light projecting element and the protruding light projecting member into and through the hood. To engage the scrim with the speed ring, the scrim may be provided with an engagement assembly and the speed ring may be provided with a detachably engagable complemental engagement assembly. In a specific embodiment, the scrim may be provided as a sheet of pliable metallic mesh or other similarly heat resistant material.

BRIEF DESCRIPTION OF THE DRAWINGS

The foregoing and further and more specific objects and advantages of the present invention will become readily apparent to those skilled in the art from the following detailed description thereof taken in conjunction with the drawings in which:

FIG. 1 illustrates a perspective view of a lightbox, in accordance with a preferred embodiment of the present invention;

FIG. 2 illustrates an enlarged fragmentary view of the lightbox of FIG. 1;

FIG. 3 illustrates a plan view of a scrim constructed in accordance with a preferred embodiment of the present invention;

FIG. 4 illustrates an exploded view of a ring with fasteners, in accordance with a preferred embodiment of the present invention; and FIG. 5 illustrates a side sectional view of the lightbox of FIG. 1; and FIGS. 6A–B illustrate the steps of mounting the scrim of FIG. 3 with the ring of FIG. 4.

DETAILED DESCRIPTION OF THE PREFERRED EMBODIMENT

Turning now to the drawings in which like reference characters indicate corresponding elements throughout the several views, attention is first directed to FIGS. 1 and 2 which illustrate a lightbox 10 including a stand 11 supporting a light projecting element or light source 12, a coupling fixture or speed ring 14, support rods 16 extending from speed ring 14, and a hood 18 that extends from speed ring 14. Speed ring 14 is secured with light source 12 to provide a support base for lightbox 10. Support rods 16 extend from speed ring 14 and form a framework for supporting hood 18. Hood 18 has an opening surrounding light source 12 adjacent speed ring 14, and extends outwardly therefrom. The opposing end of hood 18 is closed by a light diffusion material (not shown). The diffusion material turns a hard light source into a directable soft light source.

Conventionally, the intensity of the light is lowered by employing neutral density filters made of film or gel materials. These materials often discolor or melt by the heat from a light source and are easily torn, requiring frequent replacement.

Turning now to FIG. 3, a filter or scrim in accordance with the present invention and generally designated 20 is illustrated. Scrim 20 includes a sheet 22 of pliable mesh preferably constructed of metal such as aluminum, bronze, steel, etc. In this specific example, sheet 22 is generally cut into a rectangular shape with long sides 24 and 26, each of which are trimmed with a fire retardant material 28 and double stitched with a thread material 30 constructed of any suitable ultraviolet- and heat-resistant material. Ends 32 and 34 are trimmed with quick release fastening elements such as, in this specific example, a hook and loop engagement assembly commonly found under the exemplary trademark VELCRO. In this regard, end 32 is trimmed with a loop element 36, while end 34 is trimmed with a hook element 38. Thus, fastening surfaces are exposed on both sides of sheet 22 at ends 32 and 34.

The mesh size of sheet 22 can vary depending on the reduction in intensity of the light desired. Preferably, a 0.011 diameter aluminum wire screen is employed. Depending on the material used for sheet 22, different stops can be obtained such as a 1 stop, ½ stop, ⅓ stop, etc., allowing for desired control of the light intensity. Greater reduction in intensity can be obtained by employing more than one scrim 20 as will be described presently.

Referring to FIG. 5, lightbox 10 is illustrated employing scrim 20 of the present invention. Further detail can be seen in this Figure, with light source 12 provided in the form of a strobe head 42 including a flash tube 44 and a modeling light 46 extending forwardly therefrom to define a protruding member of light source 12. Speed ring 14 is securely coupled to strobe head 42 with flash tube 44 and modeling light 46 extending forwardly therethrough. Hood 18 is supported by rods 16 extending from ring 14 and enclosing flash tube 44, modeling light 46 and scrim 20. Scrim 20 is fastened to ring 14 so as to bell or curve outwardly over flash tube 44 and modeling light 46.

With additional reference to FIG. 4, complemental fastening elements to loop element 36 and hook element 38 are attached to the sides of ring 14. As can be seen, complemental hook elements 50 and complemental loop elements 52 are fixed by adhesive to adjacent sides of ring 14. This permits scrim 20 to be attached by loop element 36 engaging one of complemental hook elements 50, and hook element 38 engaging one of complemental loop elements 52. In this manner, scrim 20 can be attached horizontally or vertically to ring 14.

The steps in coupling scrim 20 to ring 14 is illustrated with reference to FIGS. 6A–B. In this specific example, end 32 is first coupled to ring 14 by engaging loop element 36 with one of elements 50. Scrim 20 is then flexed over flash tube 44 and modeling light 46 and end 34 is coupled to ring 14 by engaging hook element 38 with one of complemental loop elements 52. Further reduction in the intensity of light can be obtained by adding additional scrims to lightbox 10. This is accomplished in the manner as just described but the additional scrims are rotated 180 degrees to present the complemental element of the attachment members to the ends of the underlying scrim.

To aid in quickly setting up the desired reduction in intensity, the attachment elements are preferably color coded to identify the stop value represented by the screen used.

The present invention has been described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. In an illuminating assembly of a type including a light-projecting element having a protruding light projecting member and a speed ring for coupling a hood with the light-projecting element, an apparatus for reducing the light intensity projected from the light projecting element and the protruding light projecting member into and through the hood, the apparatus comprising:

a scrim engagable with the speed ring when the scrim is flexed to extend outwardly from the speed ring and over the light projecting element and the protruding light projecting member.

2. The apparatus of claim 1, further including means for engaging the scrim with the speed ring.

3. The apparatus of claim 2, wherein the means includes:

an engagement assembly carried by the scrim; and a detachably engagable complemental engagement assembly carried by the speed ring.

4. The apparatus of claim 3, wherein the engagement assembly includes first and second spaced-apart engagement elements.

5. The apparatus of claim 4, wherein the complemental engagement assembly includes detachably engagable first and second spaced-apart complemental engagement elements.

6. The apparatus of claim 1, wherein the scrim includes a sheet of pliable metallic mesh.

7. The apparatus of claim 6, wherein opposing ends of the sheet are engagable with the speed ring upon flexing of the sheet.

* * * * *